(12) United States Patent  
Sween

(10) Patent No.: US 9,039,809 B2  
(45) Date of Patent: May 26, 2015

(54) SYSTEM AND METHOD FOR REDUCING MINERAL BUILDUP ON DRIFT ELIMINATORS OF A COOLING TOWER

(71) Applicant: YAHOO! INC., Sunnyvale, CA (US)

(72) Inventor: Ty Sween, Ephrata, WA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/174,915

(22) Filed: Feb. 7, 2014

(65) Prior Publication Data

US 2014/0151906 A1 Jun. 5, 2014

Related U.S. Application Data

(62) Division of application No. 12/977,621, filed on Dec. 23, 2010, now Pat. No. 8,678,359.

(51) Int. Cl.
| | |
|---|---|
| *F28C 1/02* | (2006.01) |
| *F28C 1/00* | (2006.01) |
| *F28C 1/04* | (2006.01) |
| *F28C 1/16* | (2006.01) |

(52) U.S. Cl.
CPC ... *F28C 1/00* (2013.01); *F28C 1/02* (2013.01); *F28C 1/04* (2013.01); *F28C 1/16* (2013.01)

(58) Field of Classification Search
CPC ................ F28C 1/00; F28C 1/02; F28C 1/04; F28C 1/16; F28F 25/00; F28F 27/003
USPC ........... 261/26, 29, 30, 36.1, 111, 112.1, 130, 261/153, 160, 161, DIG. 11, DIG. 46, 261/DIG. 77, DIG. 86; 95/187, 198
See application file for complete search history.

(56) References Cited

U.S. PATENT DOCUMENTS

| | | | | |
|---|---|---|---|---|
| 4,318,772 | A * | 3/1982 | Kragh | 210/712 |
| 5,639,286 | A * | 6/1997 | Chen et al. | 96/275 |
| 6,070,860 | A * | 6/2000 | Kinney et al. | 261/30 |
| 8,196,908 | B2 * | 6/2012 | Lee et al. | 261/133 |
| 8,678,359 | B2 * | 3/2014 | Sween | 261/130 |
| 2004/0207102 | A1 * | 10/2004 | Sugimori et al. | 261/112.1 |
| 2005/0001334 | A1 * | 1/2005 | Roberts et al. | 261/36.1 |

* cited by examiner

*Primary Examiner* — Charles Bushey

(74) *Attorney, Agent, or Firm* — Cooper Legal Group, LLC

(57) ABSTRACT

A method directed to reducing mineral buildup on drift eliminators of a cooling tower by allowing irrigation of the drift eliminators of the cooling tower with fluid in the basin of the cooling tower to reduce mineral buildup.

8 Claims, 6 Drawing Sheets

SYSTEM AND METHOD FOR REDUCING MINERAL BUILDUP ON DRIFT ELIMINATORS OF A COOLING TOWER

CROSS-REFERENCE TO RELATED APPLICATIONS

This application is a division of, and claims priority to, U.S. application Ser. No. 12/977,621, filed on Dec. 23, 2010 now U.S. Pat. No. 8,678,359; which is incorporated by reference as if fully set forth herein.

FIELD OF THE INVENTION

The invention disclosed relates generally to cooling towers and, more particularly, to reducing mineral buildups on drift eliminators coupled with air inlets of a cooling tower.

BACKGROUND OF THE INVENTION

Cooling towers have been widely used in data center buildings, power stations, chemical plants, and other industries where cost effective and energy efficient cooling is needed. The sizes of the cooling towers vary from relatively small roof-top units to very large hyperboloid structures. In a data center building, a cooling tower may be placed on the rooftop of the building to remove waste heat generated by servers and other communication and processing equipment in operation in the data center building.

A cooling tower extracts waste heat to the atmosphere through the evaporative cooling of a fluid stream to a lower temperature. The evaporative cooling allows a portion of the fluid stream to evaporate into a moving air stream to provide significant cooling to the rest of that fluid stream. The heat from the fluid stream transferred to the air stream raises the air stream's temperature and its relative humidity, and the warm and moist air is discharged to the atmosphere. As a result, the temperature of the fluid stream is lowered.

The cooled fluid stream is collected in a basin of the cooling tower and is circulated again to absorb the waste heat from the data center. The cooling tower may be connected to a chiller or a heat exchanger. The heat exchanger may use the cooled fluid stream to absorb the waste heat; the chiller may further cool the fluid stream before it is circulated to absorb the waste heat. The temperature of the fluid stream rises again after it absorbs the waste heat from the heat source. The fluid stream is then again evaporated into the moving air stream to provide cooling to the rest of the fluid stream.

The moving air stream enters the cooling tower through one or more air inlets on the lateral walls of the cooling tower. For some cooling towers, the air inlets may be located at the base of the cooling tower and may comprise one or more drift eliminators. The drift eliminator removes entrained fluid droplets from the air stream to limit the drift rate of the fluid dream to save the fluid so that it can be recirculated for a longer period of time. Air enters the cooling tower through the air inlets and travels upward to interact with the warm fluid stream; a small portion of the warm fluid stream is evaporated which removes the heat from the remaining fluid stream. In some cooling towers, the fluid stream comprises water and the air stream comprises natural air outside of the cooling tower. The cooling tower that uses water as the fluid stream are sometimes referred to as the water cooling tower.

To provide efficient cooling, one or more fans may be placed either at the air inlet of a cooling tower to force air into the tower or on the roof of the cooling tower to pull air through the cooling tower. To increase the surface interaction area between the air stream and the fluid stream, a medium called fill is often used in a cooling tower. A splash fill comprises materials such as plastics placed to interrupt the fluid stream causing splashing. A film fill comprise of sheets of material upon which the fluid streams; the sheets of material may be made of plastics or metal alloys. The fluid stream is splashed onto the fill and the fluid droplets resulting from the splash interact with the air stream; the evaporation of the fluid stream into the moving air stream provides cooling to the rest of the fluid stream.

When the fluid evaporates in a cooling tower, any mineral constituents are left behind. The buildup of these minerals must be controlled to prevent mineral fouling of the cooling towers. In general, chemicals (dispersants) may be added to the fluid to prevent the formation of mineral scale. However, minerals may still gradually build up inside the cooling tower. In particular, minerals may build up on the drift eliminators of the cooling tower. As a result, periodic cleaning (such as a bi-weekly cleaning) of the drift eliminators may be required. The periodic cleaning of the drift eliminators may be time consuming and costly. Reducing the frequency of the cleaning schedules for the drift eliminators reduces the maintenance time and cost of the cooling tower.

SUMMARY OF THE INVENTION

The present invention provides systems and methods directed to reduce mineral buildup on drift eliminators of a cooling tower. In a particular embodiment, the present invention provides one or more irrigators to irrigate the drift eliminators using fluid in a basin of the cooling tower. A pump supplies spray nozzles to spray the fluid onto the drift eliminators to reduce mineral buildup. In some embodiments, the pump and the spray nozzles are controlled by a control unit.

In other embodiments of the present invention, the systems and methods involve monitoring the temperature of the fluid in the basin and turning on irrigators when the temperature of the fluid in the basin reaches a threshold value. In some other embodiments, the control unit may turn on a roof exhaust fan when the difference of the temperature of the fluid in the basin and the temperature outside of the cooling tower reaches certain threshold value.

BRIEF DESCRIPTION OF THE SEVERAL VIEWS OF THE DRAWINGS

The following detailed description together with the accompanying drawings will provide a better understanding of the nature and advantages of various embodiments of the present invention.

DETAILED DESCRIPTION OF EXAMPLE EMBODIMENT(S)

The following example embodiments and their aspects are described and illustrated in conjunction with apparatuses, methods, and systems which are meant to be illustrative examples, not limiting in scope.

Figure 1:
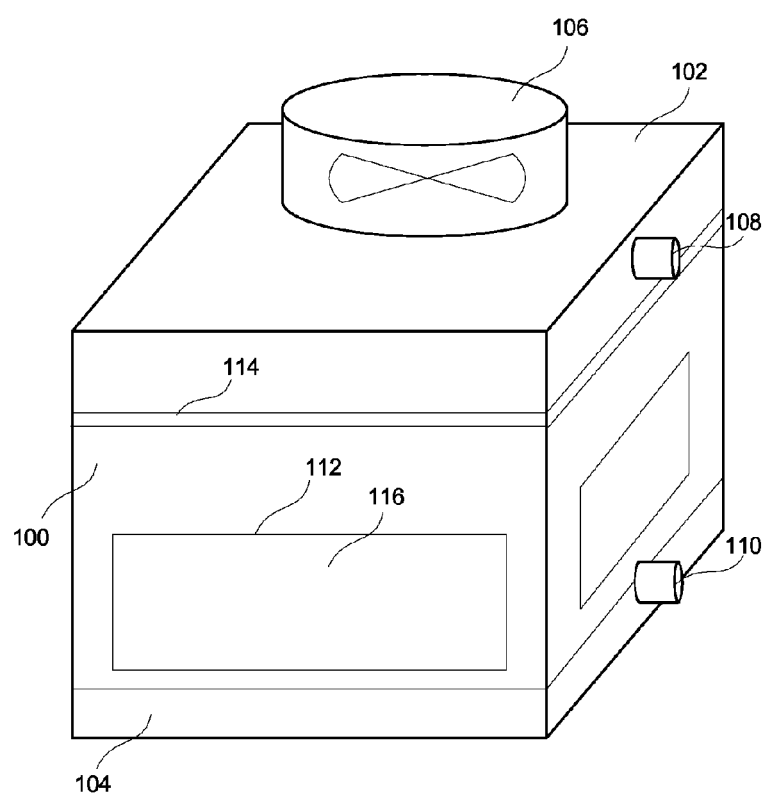
FIG. 1 is a diagram showing an example cooling tower.

FIG. 1 illustrates an example cooling tower comprising one or more lateral walls 100, a roof 102, a basin 104, an exhaust fan 106 on the roof 102, a fluid intake 108, a fluid discharge 110, and air inlets 112 each coupled with a drift eliminator 116 on the lateral walls 100. The lateral walls 100, the roof 102, and the basin 104 define a plenum. The exhaust fan 106 on the roof 102 may be connected to a control unit operable to selectively turn on the fan. In some embodiments, there may be more than one exhaust fans on the roof 102 of the cooling tower. The roof 102 and the lateral walls 100 may be made of metal such as aluminum alloy. The basin 104 may have a large capacity to hold fluid such as water.

In some embodiments, high temperature enters the cooling tower through the fluid intake 108. The high temperature fluid is sprayed down from the top of the cooling tower into the plenum; air from the air inlet 112 travels upwards inside the plenum and cools the high temperature fluid; the cooled fluid is collected in the basin 104. To assist air circulation, the exhaust fan 106 on the roof 102 may be turned on by the control unit to draw air into the cooling tower from the air inlets 112.

When the air stream and the fluid stream interact, fluid droplets may form and drift out of the cooling tower. To reduce the drift from cooling towers, drift eliminators may be incorporated into the tower design to remove as many droplets as practical from the air stream before exiting the tower either from the roof 102 or through the air inlets 112. Drift eliminators 114 may be placed below the exhaust fan 106; drift eliminators 116 may also be coupled with the air inlets 112. The drift eliminators used in cooling towers rely on inertial separation caused by direction changes while passing through the eliminators. Types of drift eliminator configurations include herringbone (blade-type), wave form, and cellular (or honeycomb) designs. The cellular units generally are the most efficient. Drift eliminators may include various materials, such as ceramics, fiber reinforced cement, fiberglass, metal, plastic, and wood installed or formed into closely spaced slats, sheets, honeycomb assemblies, or tiles. The materials may include other features, such as corrugations and water removal channels, to enhance the drift removal.

Because the drift droplets generally contain the same chemical impurities as the fluid circulating through the tower, these impurities may crystallize and buildup on the drift eliminators, especially on the side of the drift eliminators in the cooling tower. When the drift droplets evaporate through the drift eliminators, they leave fine particulate matter formed by crystallization of dissolved solids on the drift eliminators. Dissolved solids found in cooling tower drift may comprise mineral matter and chemicals for corrosion inhibition. The buildup of the mineral deposits on the drift eliminators may lead to wetting, icing, salt deposition, and related problems such as damage to equipment or to vegetation. The mineral deposits may also be converted to airborne emissions and may cause air pollution.

Periodic cleaning of the drift eliminators may be required to maintain the normal operation of the cooling tower. In particular, the drift eliminators 116 coupled with the air inlets 112 may require cleaning and removing the mineral buildups every other week. Each cleaning process to remove the mineral buildups may take up to sixty hours and be a labor intensive process. Reducing mineral buildups on the drift eliminators 116 may reduce the frequency of the cleaning the drift eliminators which saves cleaning costs and reduces the airborne emission resulting from the mineral buildups.

Figure 2:
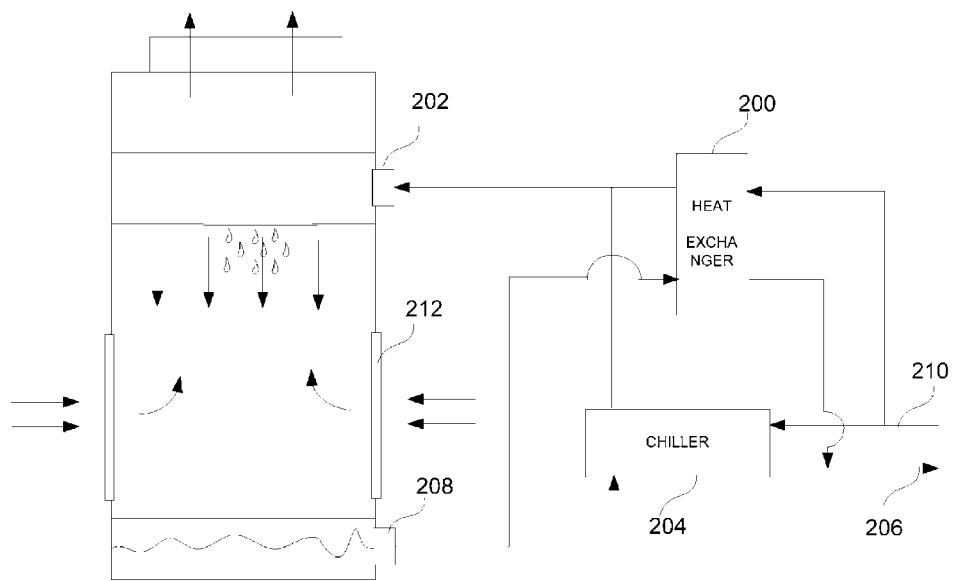
FIG. 2 is a diagram showing an example cooling tower operably connected to a heat exchanger and a chiller.

FIG. 2 illustrates an example cooling tower coupled with a heat exchanger 200 and a chiller 204. In some embodiments, the chiller 204 is in operation while the heat exchanger 200 is isolated from the system and is not included in the system operation. This type of operation may occur in summer when the temperature of the outside air is high and may not be able to provide significant cooling to the high temperature fluid stream. The high temperature fluid entering the fluid intake 202 may be at a temperature of 95° F. Outside air drawn into the cooling tower through the air inlets 212 may provide limited cooling of the high temperature fluid stream. In some embodiments, the high temperature fluid going through the cooling tower may be cooled to 85° F. and is discharged through the fluid discharge 208 and enters the chiller 204. The chiller may further cool the fluid to 45° F. Chilled fluid 206 from the chiller 204 is circulated to the data center to absorb the waste heat in the data center and provide cooling. After absorbing the waste heat load from the data center, the temperature of the fluid rises and the high temperature fluid 210 is circulated back into the chiller 204 and the cooling tower through the fluid intake 202.

In some other embodiments, the chiller is not operating while the heat exchanger is turned on. This type of operation may occur in winter when the temperature of the outside air is low. The cool outside air may be able to cool the high temperature fluid without an operating chiller. This type of operation is sometimes referred to as "free cooling" operation as the cooling is from the natural cool air. The chiller is isolated and the fluid from the cooling tower and the data center is bypassed to the heat exchanger which absorbs the heat load from the data center. The cooling tower absorbs the heat load from the data center and rejects it to the atmosphere. In some embodiments, the fluid entering the fluid intake 202 may be at a temperature of 55° F. Using natural cool air from outside of the cooling tower, the cooling tower cools the fluid to about 45° F. and discharges the fluid through the fluid discharge 208. The cooled fluid enters the heat exchanger 200 and again absorbs waste heat load.

As with any fluid based cooling tower, minerals and chemicals in the fluid may build up on the drift eliminators coupled with the air inlets 212 and may require periodic cleaning. The cleaning process may be costly and time consuming.

The cooling tower in FIG. 2 employs a counter flow design. The air movement is vertically through cooling tower in counter flow to the downwards fall of the fluid. The air stream is directly opposite to the fluid stream. Air stream first enters the cooling tower through air inlets 212 and is then drawn up vertically. The fluid may be sprayed through pressurized nozzles and flows downward, opposite to the air stream.

Figure 3:
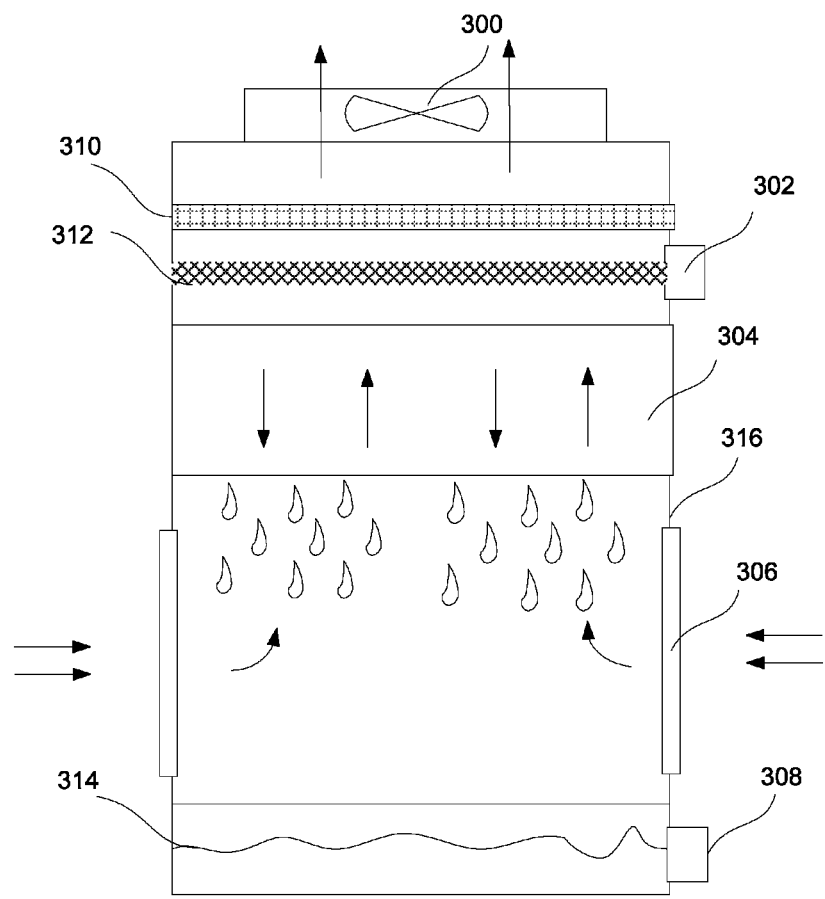
FIG. 3 is a diagram showing an example cooling tower employing a counter flow design wherein the air stream is directly opposite to the fluid stream.

FIG. 3 illustrates a side view of an example cooling tower comprising an exhaust fan 300 on the roof of the cooling tower, a fluid intake 302, a fill 304, air inlets 316 coupled with drift eliminators 306, a basin 314, a fluid discharge 308, a fluid distribution system 312, and a drift eliminator 310. In some embodiments, the fluid distribution system may comprise one or more large orifice spray nozzles made of polyvinyl chloride (PVC) plastic material. The orifice spray nozzles may have anti-sludge rings extending into the headers to prevent sediment from building up in the nozzle openings. The High temperature fluid enters the cooling tower through the fluid intake 302 and is sprayed onto the fill 304 through the fluid distribution system 312. In some embodiments, the fill 304 is constructed of inert polyvinyl chloride (PVC) plastic and is formulated to withstand fluid temperature up to 130° F. The fill 304 may comprise crossfluted sheets bonded together to induce highly turbulent mixing of the air stream and the high temperature fluid stream for superior heat transfer. The fill 304 promotes evaporation by providing a large surface area and by creating many fluid droplets with a large cumulative surface area.

Outside air is introduced into the cooling tower through the air inlets 316. In a counter flow design of a cooling tower, the air inlets 316 may be located near the base of the cooling area. Outside air may be drawn into the cooling tower and travels upwards to interact with the falling fluid stream and provide cooling to the fluid stream. Each air inlet is coupled with a drift eliminator 306 which captures and prevents drift fluid droplets from escaping the cooling tower. The drift fluid droplets, however, may leave mineral buildups comprising solid minerals and chemical deposits on the drift eliminators 306 when the drift fluid droplets evaporate on the drift eliminators 306. As a result, the drift eliminators 306 require periodic cleanings to remove the mineral buildups left behind by the drift fluid droplets.

To improve air circulation in the cooling tower, the exhaust fan 300 may be turned on to draw outside air into the cooling tower through the air inlets 316. When the exhaust fan is turned on, outside air drawn from the air inlets 316 travels upwards through the cooling tower and evaporates into the high temperature fluid stream distributed by the fluid distribution system 312 to provide cooling to the moving fluid stream. The resulting warm and moist air stream keeps traveling upwards and exits the cooling tower through the exhaust fan 300. Fluid loss may occur as the moist air comprising numerous fluid droplets drifts out of the cooling tower. To reduce the drift rate of the warm and moist air stream and thereby saving the fluid, a drift eliminator 310 may be placed below the exhaust fan 300 to remove entrained fluid droplets from the air stream.

When the high temperature fluid from the fluid intake 302 is sprayed onto the fill 304 through the fluid distribution system 312, the outside air drawn from the air inlets 316 travels upward through the fill 304 opposite the high temperature fluid stream. A small portion of the fluid is evaporated which removes the heat from the remaining high temperature fluid stream. The warm moist air is drawn to the top of the cooling tower by the exhaust fan 300 and discharged to the atmosphere. The cooled fluid drains to the basin 314 at the bottom of the cooling tower and is returned to the heat source either through a heat exchanger or a chiller.

When the fluid evaporates in a cooling tower, any mineral constituents are left behind. The buildup of these minerals may occur on the drift eliminator 310 and the drift eliminators 306 coupled with the air inlets 306. In particular, the mineral buildup on the drift eliminators 306 must be controlled to prevent mineral fouling of the cooling towers and ensure proper air circulation. In general, chemicals (dispersants) may be added to the fluid to prevent the formation of mineral scale. However, minerals may still gradually build up on the drift eliminators 306 and 310 inside the cooling tower. As a result, periodic cleaning (such as a bi-weekly cleaning) of the drift eliminators may be required. The periodic cleaning of the drift eliminators may be time consuming and costly. Reducing the frequency of the cleaning schedules for the drift eliminators reduces the maintenance time and cost of the cooling tower.

Figure 4:
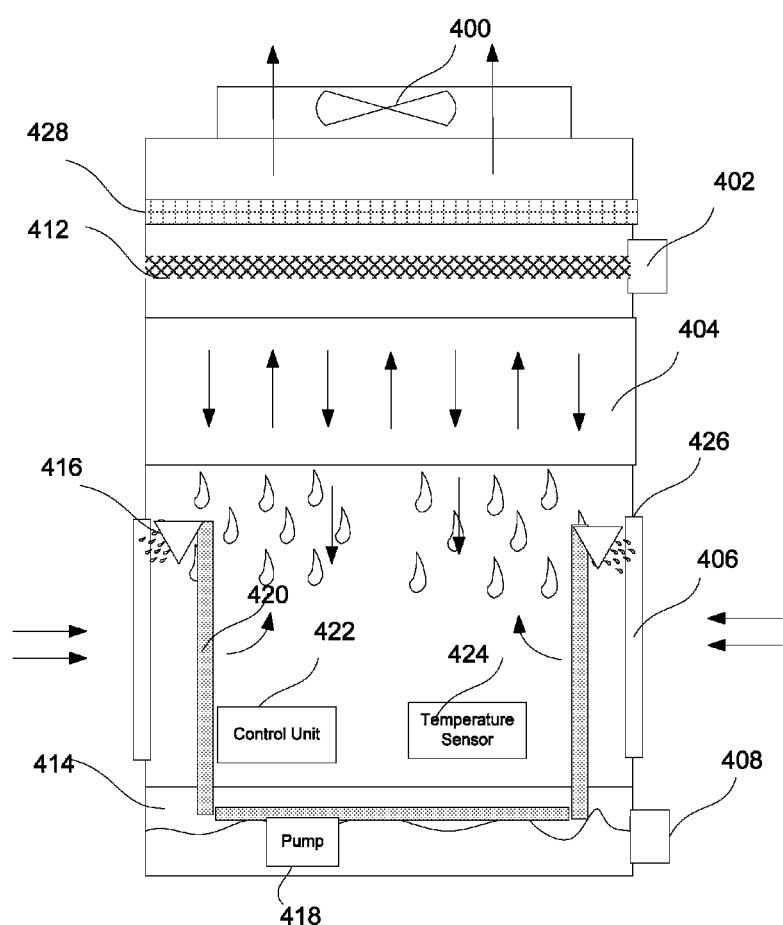
FIG. 4 is a diagram showing an example cooling tower with an example irrigation system comprising a control unit, a pump and one or more spray nozzles to irrigate the drift eliminators.

FIG. 4 illustrates an example embodiment of the invention. High temperature fluid enters the cooling tower through the fluid intake 402 and is sprayed from a top of the cooling tower onto the fill 404 through a fluid distribution system 412 comprising one or more spray nozzles. Simultaneously, outside air is drawn from the air inlets 426 and travels upward through the fill 404 opposite the high temperature fluid stream. A small portion of the fluid is evaporated which removes the heat from the remaining high temperature fluid stream. The warm moist air is drawn to the top of the cooling tower by the exhaust fan 400 and discharged to the atmosphere. In some embodiments, the drift eliminator 428 and the drift eliminators 406 couple with each air inlet 406 remove entrained fluid droplets from the air stream to limit the drift rate to less than 0.001% of the recirculating fluid rate. The cooled fluid drains to the basin 414 at the bottom of the cooling tower and is returned to the heat source to absorb any waste heat load.

In one embodiment of the present invention, a pump 418 is operably connected to the pipes 420 and is operative to supply fluid in the basin 414 to the pipes 420. In some embodiments, one or more spray nozzles 416 are connected to the pipes 420 and are operable to spray the fluid onto the drift eliminators 406 coupled with the air inlets 426. The spray nozzles 416 may spray the drift eliminators 406 from inside the cooling tower. In other embodiments, the pipes 420 may be coupled to the air inlets 426 and provide continuous irrigation to the drift eliminators 406. In some other embodiments, the pipes 420 may reach the drift eliminator 428 and the spray nozzles 416 may spray fluid onto the drift eliminator 428. In yet other embodiments, the pipes may reach and may be coupled with the drift eliminator 428 to provide constant irrigation to prevent mineral buildup.

In other embodiments, a control unit 422 is operably connected to the pump 418. and is operative to turn on or off the pump. In some other embodiments, the control unit 422 is operably connected to a temperature sensor 424. The temperature sensor 424 measures the fluid temperature in the basin 414, the ambient air temperature inside the cooling tower, and the temperature outside of the cooling tower. In one embodiment, when the temperature of the fluid in the basin 414 reaches a threshold value, the control unit 422 turns on the pump 418. In another embodiment, when the difference in temperature between the fluid in the basin 414 and the ambient air temperature inside the cooling tower reaches a threshold value, the control unit 422 turns on the pump 418. In some other embodiment, when the difference in temperature between the fluid in the basin 414 and the air temperature outside the cooling tower reaches a certain threshold, the control unit 422 turns on or off the pump 418. In yet another embodiments, when the difference in temperature among the fluid in the basin 414, the air temperature inside the cooling tower, and the air temperature outside of the cooling tower reaches certain threshold values, the control unit turns on or off the pump 418.

In some other embodiments, the control unit 422 is operably connected to the pump 418, the exhaust fan 400, and the temperature sensor 424. In one embodiment, when the fluid temperature in the basin 414 reaches a threshold value, the control unit 422 turns on the exhaust fan 400 and the pump 418. In another embodiment, when the difference in temperature between the fluid in the basin 414 and the ambient air temperature inside the cooling tower reaches a threshold value, the control unit 422 turns on the pump 418 and the exhaust fan 400. In some other embodiment, when the difference in temperature between the fluid in the basin 414 and the air temperature outside the cooling tower reaches a certain threshold, the control unit 422 turns on the pump 418 and the exhaust fan 400. In yet another embodiments, when the difference in temperature among the fluid in the basin 414, the air temperature inside the cooling tower, and the air temperature outside of the cooling tower reaches certain threshold values, the control unit turns on or off the pump 418 and the exhaust fan 400.

In yet some other embodiments, the control unit 422 is operably connected to the pump 418, the exhaust fan 400, the temperature sensor 424, and each individual spray nozzle 416. Depending on the temperature of the ambient air inside the cooling tower, the fluid in the basin 414, and the air temperature outside of the cooling tower as measured by the temperature sensor 424, the control unit 422 is operable to selectively turn on or off the pump 418, each spray nozzle 416, and the exhaust fan 400.

Figure 5:
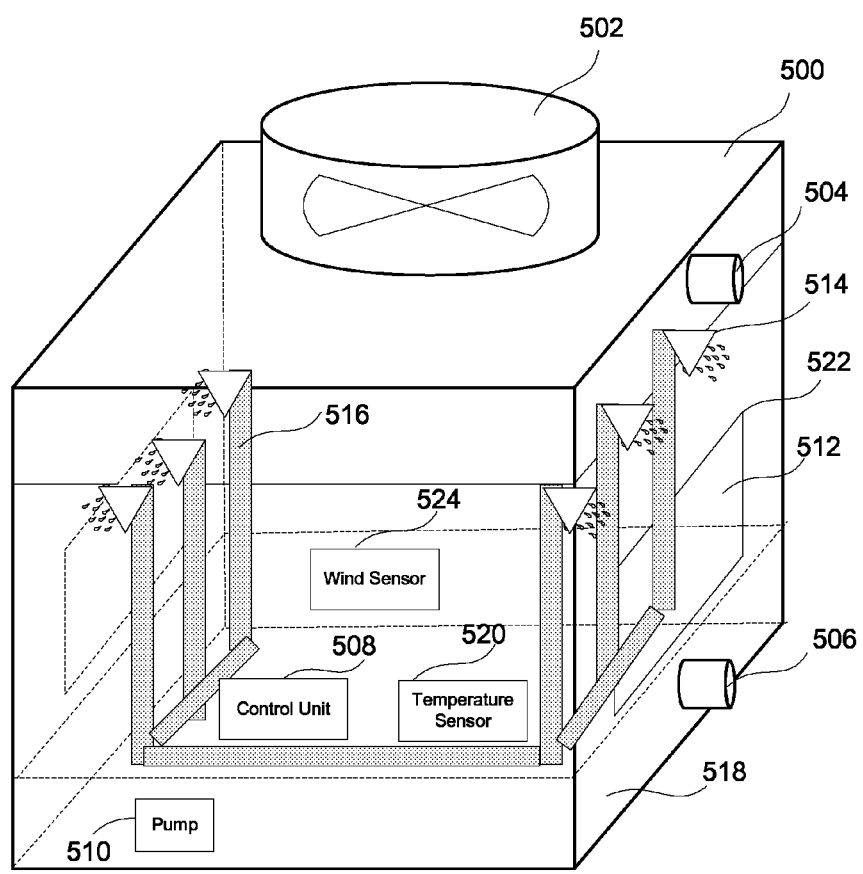
FIG. 5 is a diagram showing another view of an example cooling tower with an example irrigation system.

FIG. 5 illustrates another example embodiment of the present invention. A cooling tower comprises an exhaust fan 502, air inlets 512 wherein each air inlet is coupled with a drift eliminator 512, a fluid intake 504, a basin 518, a fluid discharge 506, spray nozzles 516, a pump 510, a control unit 508, a temperature sensor 520, and a wind sensor 524. In some embodiments, the control unit 508 periodically turns on the pump 508 to supply the spray nozzles 516 with fluid in the basin 518. In other embodiments, the control unit 508 selectively turns on the exhaust fan 502, the pump 510 and the spray nozzles 516 based on the temperature in the cooling tower, the fluid temperature in the basin 510, and the air temperature outside of the cooling tower as measured by the temperature sensor 510. In yet other embodiments, the control unit 508 selectively turns on the exhaust fan 502, the pump 510 and each individual spray nozzle 516 based on the temperature in the cooling tower, the fluid temperature in the basin 510, and the air temperature outside the cooling tower.

In yet other embodiments, the control unit 508 is also operably connected to the wind sensor 524. The wind sensor 524 detects the direction and the pressure of air stream both inside and outside of the cooling tower. The control unit 524 is operable to selectively turn on or off the pump 510, each spray nozzle 516, and the exhaust fan 502 based on the temperature of the ambient air inside the cooling tower, the fluid in the basin 518, the air temperature outside of the cooling tower as measured by the temperature sensor 520, and the direction and the pressure of the air stream both inside and outside of the cooling tower as measured by the wind sensor 524.

Figure 6:
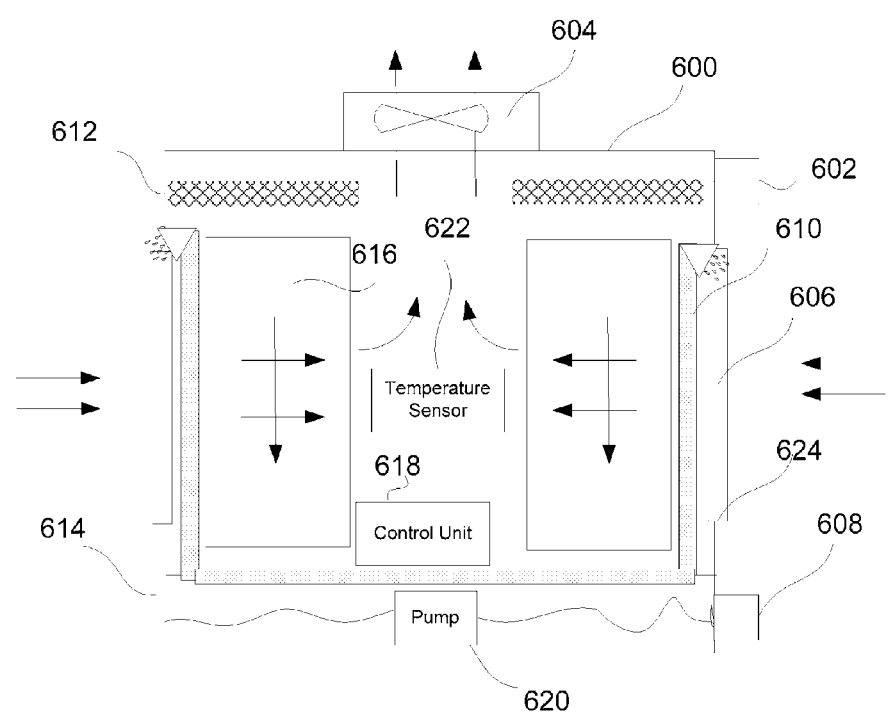
FIG. 6 is a diagram showing an example cooling tower employing a cross flow design wherein the air stream is directed perpendicular to the fluid stream.

FIG. 6 illustrates another example embodiment of the present invention. In this embodiment, a cross flow design is used wherein the air stream is perpendicular to the fluid stream. High temperature fluid enters the cooling tower through the fluid intake 602 and is sprayed onto the fill 616 through a fluid distribution system 612 comprising one or more spray nozzles. Simultaneously, outside air is drawn from the air inlets 624 and travels through the fill 616 in a direction that is perpendicular to the high temperature fluid stream. A small portion of the fluid is evaporated which removes the heat from the remaining high temperature fluid stream. The air continues through the fill 616 and enters a plenum area in the middle of the cooling tower. The warm moist air is drawn to the top of the cooling tower by the exhaust fan 604 and discharged to the atmosphere. The drift eliminator 606 couple with each air inlet 624 removes entrained fluid droplets from the air stream to limit the drift rate. The basin 614 collects the cooled fluid and discharges the fluid through the fluid discharge 608.

In one embodiment of the present invention, a pump 620 is operably connected to the spray nozzles 610 and is operative to supply fluid in the basin 614 to the spray nozzles. The spray nozzles 610 are operable to spray the fluid onto the drift eliminators 606 coupled with the air inlets 624. The spray nozzles 610 may spray the drift eliminators 606 from inside the cooling tower.

In some embodiments, a control unit 618 is operably connected to a pump 620, one or more spray nozzles 610 and a temperature sensor 622. In some embodiments, the control unit 608 is operable to selectively turn on or off the exhaust fan 604, the pump 620 and each individual spray nozzle 610 based on the temperature in the cooling tower, the fluid temperature in the basin 614, and the air temperature outside of the cooling tower as measured by the temperature sensor 622.

The present invention has been explained with reference to specific embodiments. For example, while embodiments of the present invention have been described with reference to specific components and configurations, those skilled in the art will appreciate that different combination of components and configurations may also be used. For example, an integrated irrigation system with the air inlets may be used to irrigate the drift eliminators to reduce mineral buildup. Other embodiments will be evident to those of ordinary skill in the art. It is therefore not intended that the present invention be limited, except as indicated by the appended claims.

The invention claimed is:

1. A method to reduce mineral buildup on drift eliminators coupled with air inlets of a cooling tower, comprising:
    supplying fluid from a basin of the cooling tower to one or more irrigators;
    irrigating the drift eliminators using the one or more irrigators with the fluid supplied from the basin, wherein each drift eliminator comprises a plurality of openings through which outside air is drawn to the cooling tower; and
    collecting the fluid used to irrigate the drift eliminators in the basin of the cooling tower.

2. The method of claim 1, further comprising using at least one exhaust fan to draw the outside air to the cooling tower.

3. The method of claim 2, wherein one or more pumps supply the fluid in the basin to irrigate the drift eliminators.

4. The method of claim 3, wherein each irrigator comprises one or more spray nozzles operable to spray the fluid to irrigate the drift eliminators.

5. The method of claim 4, wherein the spray nozzles spray the fluid onto the drift eliminators from inside the cooling tower.

6. The method of claim 5, wherein the spray nozzles, the pumps and the exhaust fans are responsive to a control unit operable to turn on the spray nozzles, the pumps and the fans when the temperature of the irrigating fluid in the basin reaches a predetermined value.

7. The method of claim 6, wherein the control unit is operable to selectively turn on the spray nozzles, the pumps and the exhaust fans based on the temperature of the fluid in the basin.

8. The method of claim 7, further comprising a temperature sensor operably connected to the control unit, wherein the control unit selectively turns on the spray nozzles and the pumps based on the air temperature outside of the cooling tower measured by the temperature sensor.

\* \* \* \* \*